INVENTOR
Joe Earle Hodgkins
Bazeel B. Anderson

ATTORNEY

Aug. 29, 1961  J. E. HODGKINS ET AL  2,997,881
APPARATUS AND METHOD FOR DETERMINING SPECIFIC GRAVITY
Filed Nov. 4, 1959  4 Sheets-Sheet 3

INVENTOR
Joe Earle Hodgkins
Bazeel B. Anderson

BY

ATTORNEY

Aug. 29, 1961 J. E. HODGKINS ET AL 2,997,881
APPARATUS AND METHOD FOR DETERMINING SPECIFIC GRAVITY
Filed Nov. 4, 1959 4 Sheets-Sheet 4

INVENTOR
Joe Earle Hodgkins
Bazeel B. Anderson

BY

ATTORNEY

2,997,881
APPARATUS AND METHOD FOR DETERMINING SPECIFIC GRAVITY

Joe Earle Hodgkins and Bazeel B. Anderson, Fort Worth, Tex., assignors to Anderson Laboratories, Inc., Fort Worth, Tex., a corporation of Texas
Filed Nov. 4, 1959, Ser. No. 850,913
3 Claims. (Cl. 73—440)

This invention relates to a method of determining the specific gravity of materials, and an apparatus therefor.

An object of the invention is to provide a simple, accurate, and economical method of determining the specific gravity of materials, and an apparatus therefor, in which the sample of material to be tested may comprise a single drop.

The invention is applicable to the determination of specific gravity of blood, fruit juices, brines, aqueous acids, urine, milk and milk products, and other aqueous solutions or dispersions of hydrophilic solids or liquids, the specific gravity of which is determined on a routine basis.

The invention is also applicable to the determination of specific gravity of oils, both vegetable and mineral, and solutions or dispersions of normally non-aqueous or hydrophobic liquids or solids.

An important feature of the invention is that only a few seconds are required to measure the specific gravity of an unknown.

Another advantageous feature of the invention is that the complete determination requires only a single drop of material.

The invention contemplates a method of determining the specific gravity of materials in which a column of liquid having a linear specific gravity or density gradient between its upper and lower extremes, and immiscible with the materials to be tested, is arranged in an elongated tubular receptacle having calibrations thereon, and minute samples of standard materials having known specific gravities greater and less, respectively, than the specific gravities of the materials to be tested, immiscible with the liquid in the column, and preferably having distinctive identifying colors, are dropped into the column, whereby the specific gravity of each of the standard materials is balanced against the specific gravity gradient of the liquid in the column, and is proportional to its displacement of such liquid, and the standard materials are adapted to float in the column at different elevations, depending on their specific gravities, and minute samples of materials to be tested are thereafter dropped into the column, and the specific gravities of the last mentioned materials are determined by comparing their displacement of the liquid in the column, as reflected by their vertical positions in the column relative to the calibrations thereon, with the positions of the standard materials therein.

The invention further contemplates a method as described in which the column of liquid having a linear specific gravity or density gradient between its upper and lower extremes, and immiscible with the materials to be tested, comprises a progressive mixture of two liquids, miscible with each other, having specific gravities greater and less, respectively, than the specific gravities of the materials to be tested, the relative proportions of the respective liquids increasing and decreasing inversely in proportion to the distances from the upper and lower extremes of the column.

The invention further contemplates a method as described in which the column of liquid having a linear specific gravity or density gradient between its upper and lower extremes, and immiscible with the materials to be tested, is prepared by providing a normally vertically disposed tubular receptacle, closed at its lower end and having an elongated intermediate portion, of restricted cross sectional area, adapted to contain the column of liquid, and having calibrations thereon, and having enlarged upper and lower end portions forming reservoirs adapted to contain bodies of the two component liquids, respectively, partially filling the receptacle, to a point within the elongated intermediate portion thereof equidistant from the calibrations thereon corresponding to the upper and lower extremes of the column, with the component liquid having the greater specific gravity, gradually adding to the body of liquid in the receptacle, substantially without mixing, the component liquid having the lesser specific gravity, displacing air from the receptacle and closing its upper end, turning the receptacle on its side, and positioning it at such an angle relative to the horizontal plane that the interface between the two component liquids extends horizontally, diagonally across the intermediate portion of the receptacle, between the calibrations thereon corresponding to the upper and lower extremes of the column, whereby progressively increasing and decreasing proportions of the respective component liquids are disposed adjacent opposite extremes of the column, rotating the receptacle gently about its longitudinal axis, whereby the component liquids are uniformly mixed at their interface in progressively increasing and decreasing proportions, and thereafter returning the receptacle to its original position and removing its top closure.

The invention further contemplates a method as described in which the testing of materials is continued until a number of samples of materials being tested have collected in the column, along with samples of standard materials having known specific gravities, after which the column is cleared by dropping therein finely divided material having a greater density than the liquid in the column and immiscible therewith, but miscible with the material of the samples, whereby the samples are weighted and drop to the bottom of the receptacle.

The invention further contemplates apparatus for the purpose described comprising, in combination with a normally vertically disposed tubular receptacle, closed at its lower end and having an elongated intermediate portion, of restricted cross sectional area, adapted to contain a column of liquid having a linear specific gravity or density gradient between its upper and lower extremes, and immiscible with the materials to be tested, and comprising a progressive mixture of two liquids, miscible with each other, having specific gravities greater and less, respectively, than the specific gravities of the materials to be tested, the relative proportions of the respective liquids increasing and decreasing inversely in proportion to the distances from the upper and lower extremes of the column, the intermediate portion having calibrations thereon, and the receptacle having enlarged upper and lower end portions forming reservoirs adapted to contain bodies of the two component liquids, respectively, an addition funnel whereby the component liquid having the lesser specific gravity may be gradually added, substantially without mixing, to a body of the component liquid having the greater specific gravity disposed within the receptacle, and partially filling it, to a point equidistant betwen the uppermost and lowermost calibrations thereon, corresponding to the upper and lower extremes of the column, a removable top closure for the receptacle having an overflow opening therein, and a stand for the receptacle having a base portion, an upstanding portion, and cradle means on the upstanding portion engageable with the receptacle adjacent opposite ends of the intermediate portion, beyond the calibrations thereon, and adapted to support the receptacle in its vertical position with its lower end portion resting on the base portion, the cradle means being further adapted, upon turning the stand on its side, whereby the upstanding portion thereof becomes its base, to support the receptacle on its side, for rotation about its longitudinal axis to effect uniform mixing of the component liquids at their interface, at such inclination relative to the horizontal plane that the interface between the two component liquids, before mixing them, extends horizontally, diagonally across the intermediate portion of the receptacle, between the calibrations thereon corresponding to the upper and lower extremes of the column, whereby progressively increasing and decreasing proportions of the respective component liquids are disposed adjacent opposite extremes of the column.

The invention will be readily understood by referring to the following description and the accompanying drawing, in which.

Figures 1, 2:
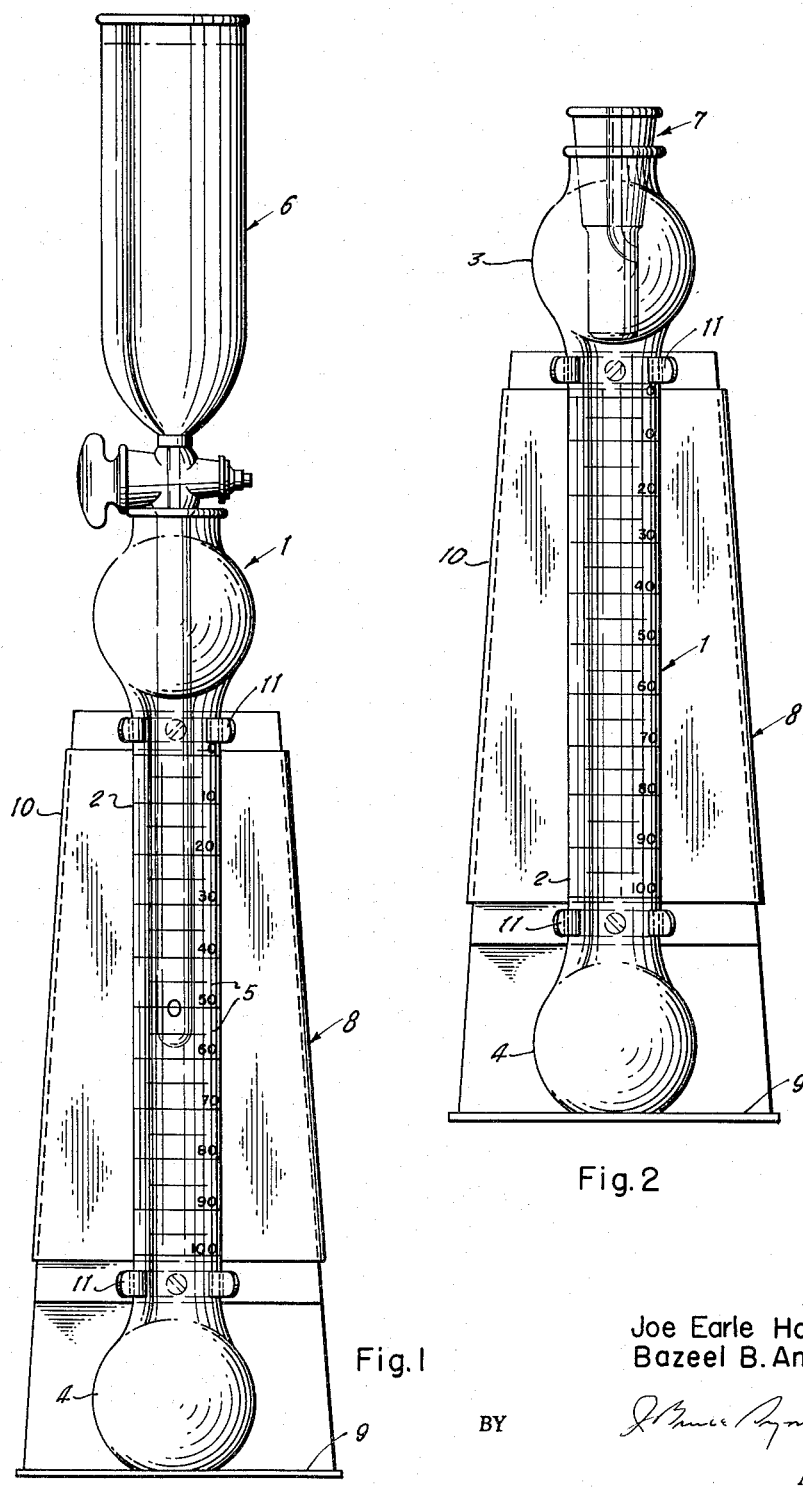
FIG. 1 is a front elevational view of apparatus embodying the invention, showing one step in the preparation of a column of liquid having a linear specific gravity or density gradient between its upper and lower extremes.
FIG. 2 is a view similar to FIG. 1, showing another step in the preparation of a column of liquid having a specific gravity gradient therein.

In one form thereof this invention concerns the determination of specific gravity of aqueous solutions or dispersions of hydrophilic liquids or solids. The same procedure is applicable also to non-aqueous dispersions or solutions of normally hydrophobic solutions, liquids, or solids, but different combinations of component liquids must be employed to produce a suitable column of liquid having a specific gravity gradient therein.

A column of liquid having a linear specific gravity or density gradient between its upper and lower extremes, for use in determining the specific gravity of aqueous solutions or dispersions of hydrophilic liquids or solids, may be prepared by pouring together two non-aqueous solvents, usually referred to as organic solvents, without intimate mixing.

Ordinarily two miscible solvents, assuming ideal behavior, when intimately mixed, will assume a specific gravity which is an average between the specific gravities of the two solvents. If, however, a solvent of relatively low specific gravity is poured onto a miscible solvent of relatively high specific gravity, and only slightly mixed at the interface, a specific gravity gradient will be set up at the original interface of the two solvents which will vary linearly between the specific gravities of the two solvents, if mixing has been carried out properly.

The height of the gradient, i.e., the length of the solution where the specific gravity varies from the highest possible value to the lowest possible value, is dependent on the degree of mixing of the two solvents at the interface, and the degree of linearity between any two given points is dependent on the uniformity of mixing.

If a drop of solvent or solution which is immiscible with the two selected solvents for the gradient, and has a specific gravity somewhere between the specific gravity of the two solvents, is added to a column of liquid having a specific gravity gradient therein, the drop will fall because of gravity, and will stop its fall only when it reaches a point in the column which is exactly equal to its specific gravity.

By calculating the specific gravity at the point in the column where the drop ceases to fall, the specific gravity of the drop is known. Since the specific gravity gradient of the liquid within the column is linear, and if two immiscible specific gravity standards of high and low ranges are added, the distance, measured with a ruler or other measuring device, which a third drop, or an unknown solution, drops below the highest standard may be used to calculate the specific gravity of the unknown.

The method of the invention is applicable to almost any material through the proper selection of base solvents, used to form a column of liquid having a specific gravity gradient therein, and standard specific gravity solutions. The base solvents and immiscible standards can be selected to cover the range of specific gravity to be determined.

It has been found that mixtures of kerosene and chlorobenzene, or anisole and chlorobenzene, or kerosene and dichloro ethylene produce excellent base solvents. Xylene and toluene do not work well since some what is dissolved from the standards, and the column of liquid having the specific gravity gradient therein appears to change with time.

Kerosene and chlorobenzene do not dissolve the standards, and can be intimately mixed to give base solvents with specific gravity between 0.85 and 1.100. Thus these solvents fall in the ranges of specific gravity which are most useful for most routine determinations.

The apparatus shown is the only apparatus available for preparing a column of liquid having a linear specific gravity gradient or density gradient between its upper and lower extremes; which permits rapid measurement of readings between an unknown solution and standard solutions; and which maintains the specific gravity gradient constant for long periods of time.

The apparatus of the invention permits rapid, uniform preparation of test columns of liquid having linear specific gravity or density gradients, whereby results obtained by use of the apparatus are dependable, and are reproducible.

Figure 4:
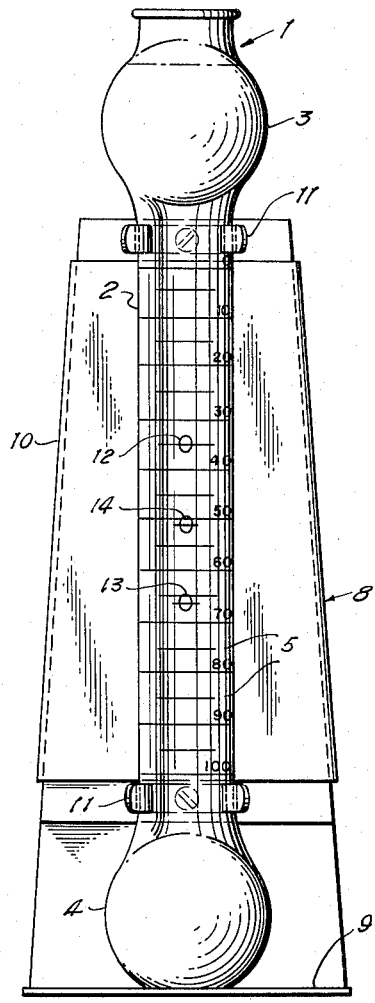
FIG. 4 is a front elevational view showing a sample of material being tested to determine its specific gravity.
Figure 5:
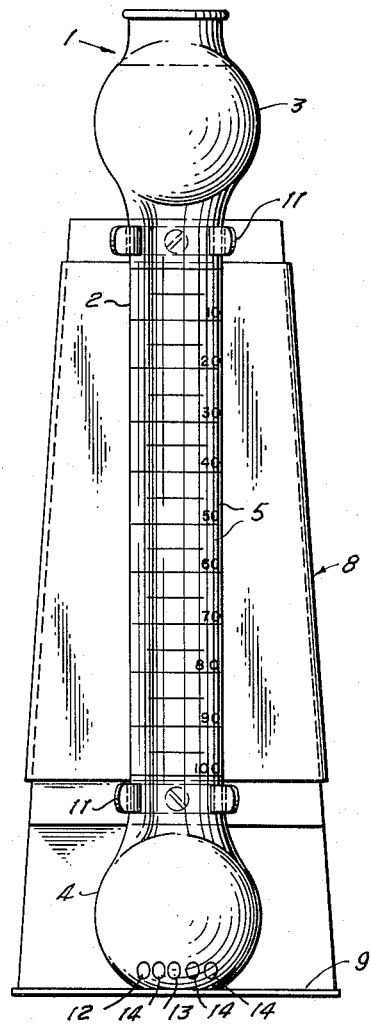
FIG. 5 is a view similar to FIG. 4, showing the step of clearing the column.

Referring to FIGS. 4 and 5 of the drawing, the apparatus of the invention includes a normally vertically disposed tubular receptacle, indicated generally by the numeral 1, which is closed at its lower end and has an elongated intermediate portion 2, of restricted cross sectional area, and enlarged upper and lower end portions 3 and 4.

The intermediate portion 2 has calibrations 5 thereon, and is adapted to contain a column of liquid having a linear specific gravity or density gradient between its upper and lower extremes, and immiscible with the materials to be tested, and comprising a progressive mixture of two liquids, miscible with each other, having specific gravities greater and less, respectively, than the specific gravities of the materials to be tested, the relative proportions of the respective liquids increasing and decreasing inversely in proportion to the distances from the upper and lower extremes of the column.

The enlarged upper and lower end portions 3 and 4 form reservoirs adapted to contain bodies of the two component liquids, respectively.

As shown in FIG. 1, an addition funnel 6, which has a small opening in one side thereof, adjacent its lower end, is employed to gradually add the component liquid having the lesser specific gravity, substantially without mixing, to a body of the component liquid having the greater specific gravity disposed within the receptacle 1. The tip of the funnel 6 is immersed in the liquid within the receptacle 1, and the funnel 6 is gradually raised in the receptacle 1 as liquid is added.

The receptacle 1 is partially filled with the component liquid having the greater specific gravity, to a point equidistant between the calibrations 5 corresponding to the upper and lower extremes of the column, before the other component liquid is added thereto.

The receptacle 1 is completely filled with liquid, and thereafter a removable top closure 7, which has an overflow opening therein, is inserted in the receptacle 1, as shown in FIG. 2, care being taken to insure that no air is trapped in the receptacle 1.

The numeral 8 designates generally a stand for the receptacle 1. The stand 8 has a base portion 9, an upstanding portion 10, and cradle means 11 on the upstanding portion 10 engageable with the receptacle 1 adjacent opposite ends of the intermediate portion 2, beyond the calibrations 5 thereof, and adapted to support the receptacle 1 in its vertical position with its lower end portion 4 resting on the base portion 9.

The front of the upstanding portion 10 of the stand 8 has a light reflecting surface directly behind the intermediate portion 2 of the receptacle 1.

Figure 3:
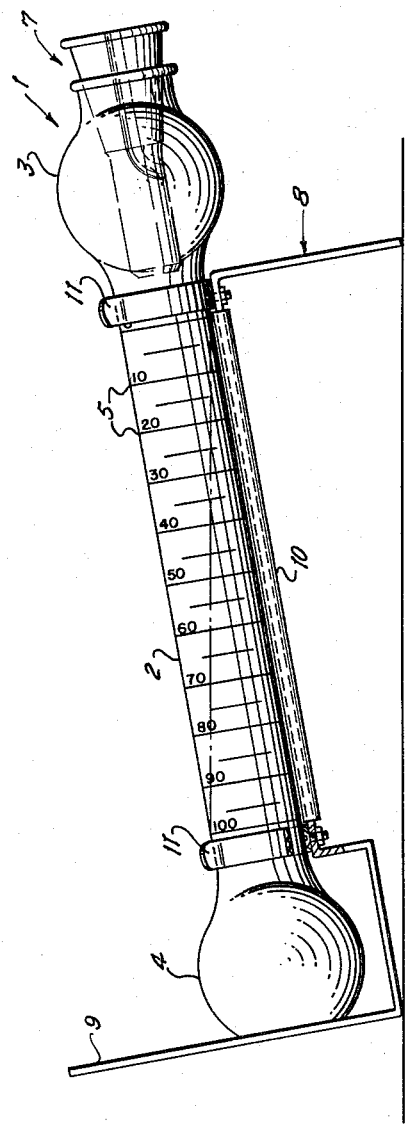
FIG. 3 is a side elevational view, showing another step.

As shown in FIG. 3, the cradle means 11 of the stand 8 is further adapted, upon turning the stand 8 on its side, whereby the upstanding portion 10 thereof becomes its base, to support the receptacle 1 on its side, for rotation about its longitudinal axis to effect uniform mixing of the component liquids at their interface, at such inclination relative to the horizontal plane that the interface between the two component liquids, before mixing them, extends horizontally, diagonally across the intermediate portion 2 of the receptacle 1, between the calibrations 5 thereon corresponding to the upper and lower extremes of the column, whereby progressively increasing and decreasing proportions of the respective component liquids are disposed adjacent opposite extremes of the column.

The receptacle 1 is gently rotated with the fingers about its longitudinal axis, while supported on the stand 8 in the manner described, to effect uniform mixing of the component liquids at their interface. Thereafter the receptacle 1 is returned to its original position, as shown in FIG. 4, and its top closure 7 is removed.

As shown in FIG. 4, one drop each of two specific gravity standards, selected to represent extremes of the range of specific gravity to be measured, are added to the test column in the receptacle 1. The standard materials are designated by the numerals 12 and 13. Other standards within this range may be added for convenience of reading, or if a higher order of accuracy is desired.

Figure 6:
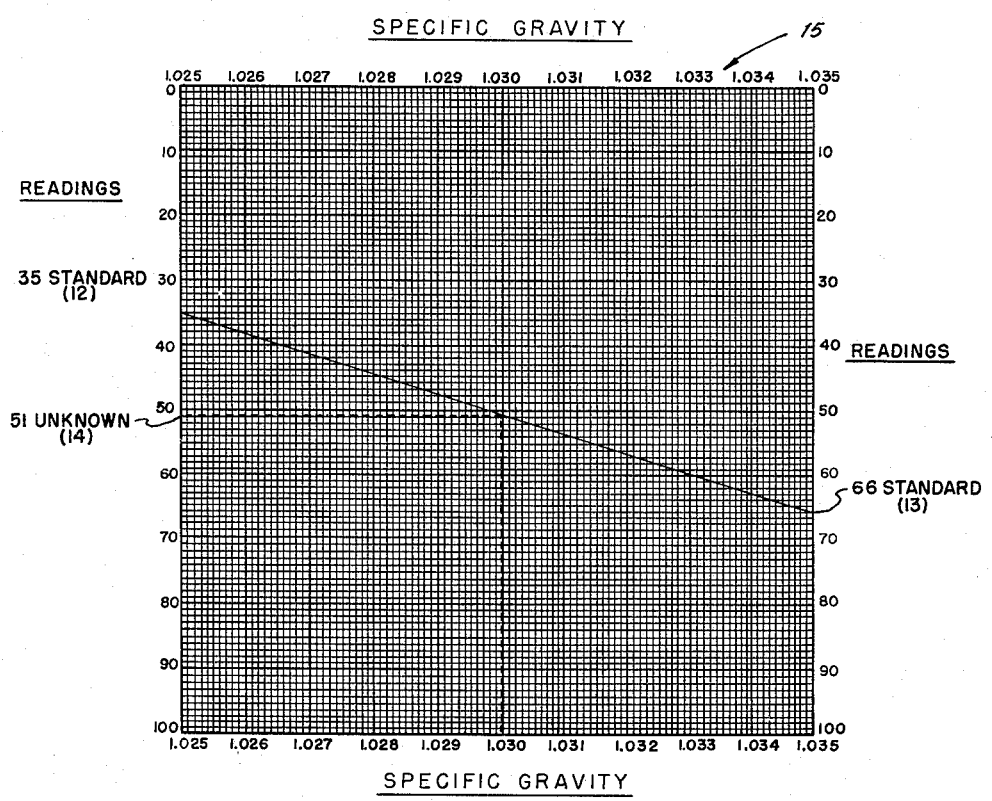
FIG. 6 shows diagrammatically a form of chart which advantageously may be used in conjunction with the apparatus shown in FIGS. 1 to 5, for plotting the specific gravity of materials.

A drop of the unknown liquid, designated by the numeral 14, is then added to the test column within the receptacle 1. The drop 14 is observed as it falls thru the liquid, and the calibration 5 opposite which it comes to rest is noted. The calibrations 5 opposite which the drop 14, the lighter standard 12, and the heavier standard 13 come to rest are recorded on the chart 15 (FIG. 6).

On the basis of the relative positions of the drop 14 and the standards 12 and 13, as above described, the specific gravity of the drop 14 may be calculated by use of the chart 15, or alternatively, the following equation:

$$U = S1 + \frac{(S2-S1)(Ru-R1)}{R2-R1}$$

in which U is the specific gravity of the unknown; S1 is the specific gravity of the lighter standard; S2 is the specific gravity of the heavier standard; Ru is the reading of the unknown sample; R1 is the reading of the lighter standard; and R2 is the reading of the heavier standard.

As shown in FIG. 5, the testing of materials is continued until a number of test drops 14, as well as the standards 12 and 13, have collected in the receptacle 1, after which the receptacle 1 is cleared by adding a finely divided weighting material, such as a salt, which is immiscible with the column of liquid in the receptacle 1 but is miscible with the test drops 14 and the standards 12 and 13, whereby the drops 12, 13, and 14 are weighted and settle to the bottom of the receptacle 1.

The invention may be modified in various ways without departing from the spirit and scope thereof. For example, the length of the column of liquid having the specific gravity gradient therein may be increased as desired, whereby a higher degree of accuracy may be obtained.

We claim:
1. A method of preparing a density gradient having substantially linear characteristics and consisting of two miscible and compatible liquids having different densities which comprises partially filling a liquid column in a columnar container with a first liquid having a predetermined density, while maintaining the container in an upright position, gradually adding to the column of liquid in the container, at its surface, substantially without mixing, a portion of a second liquid, having a predetermined density lower than the density of the first liquid, sufficient to substantially fill the container and displace air therefrom, turning the container on its side and positioning it at an inclined angle relative to the horizontal plane so that the interface between the two liquids extends horizontally, diagonally across the container, between opposite ends of the liquid column, whereby inversely increasing and decreasing proportions of the respective liquids are positioned adjacent opposite ends of the liquid column, rotating the container gently about its longitudinal axis so that the liquids are uniformly mixed in inversely increasing and decreasing proportions, and thereafter returning the container to its upright position.

2. In a method of determining the specific gravity of materials in which a column of liquid having a linear density gradient, and immiscible with the materials to be tested, is arranged in a columnar container, and minute samples of standard materials having known specific gravities greater and less, respectively, than the specific gravities of the materials to be tested, immiscible with the liquid in the column, are dropped into the column, and minute samples of materials to be tested are thereafter dropped into the column, and the specific gravities of the last mentioned materials are determined by comparing their displacement of the liquid in the column, as reflected by their vertical positions in the column, with the positions of the standard materials therein, the steps of continuing the testing of materials until a number of samples of materials being tested have collected in the column, along with samples of standard materials having known specific gravities, and thereafter clearing the column by dropping therein finely divided material having a greater density than the liquid in the column and immiscible therewith, but miscible with the material of the samples, whereby the samples are weighted and drop to the bottom of the container.

3. Apparatus for determining the specific gravity of materials comprising, in combination with a columnar container, closed at its lower end and having an elongated intermediate portion, of restricted cross sectional area, having calibrations thereon, and having enlarged upper and lower end portions, a removable top closure for the container having an overflow opening therein, and a stand for the container having a base portion normally extending below the lower end of the container and providing a support therefor adapted to support the container in a substantially vertical position, an upstanding portion connected to the base portion and normally extending upwardly therefrom, along one side of the container, and cradle means on the upstanding portion embracing the container intermediate its ends, the upstanding portion having means for abutment against a supporting surface, upon turning the stand on its side, whereby the container is adapted to be supported in an inclined position relative to the supporting surface.

References Cited in the file of this patent
UNITED STATES PATENTS
2,825,698    Taylor et al. _____ Mar. 4, 1958

OTHER REFERENCES
Exton: "Determination of Specific Gravities of Mimimal Amounts of Liquids," published in Transactions of the American Urological Association, vol. XIII, 1920. (Copy in Div. 36, 73–32 pages 84, 85, 92½A.)